M. R. TENNANT.
APPARATUS FOR PRODUCING OZONE.
APPLICATION FILED JULY 12, 1913.
1,218,817.  Patented Mar. 13, 1917.
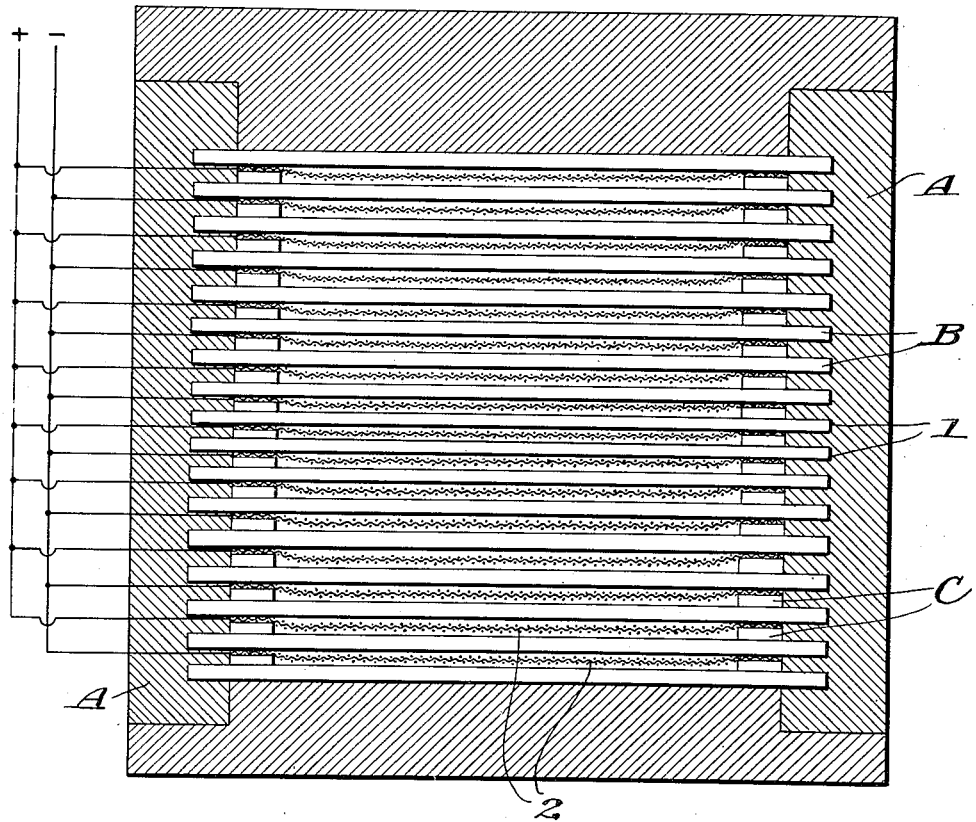

UNITED STATES PATENT OFFICE.

MELBOURNE ROY TENNANT, OF COLORADO SPRINGS, COLORADO.

APPARATUS FOR PRODUCING OZONE.

1,218,817.   Specification of Letters Patent.   Patented Mar. 13, 1917.

Application filed July 12, 1913.   Serial No. 778,770.

*To all whom it may concern:*

Be it known that I, MELBOURNE ROY TENNANT, a citizen of the United States, residing at Colorado Springs, in county of El Paso and State of Colorado, have invented certain new and useful Improvements in Apparatus for Producing Ozone, of which the following is a specification.

This invention relates to an improvement in an apparatus for producing ozone, and the object is to provide means for producing electric arcs for emitting a constant glow of light, so that atmospheric oxygen when passed through the light will undergo a molecular change from $O_2$ to $O_3$ producing ozone and dissociated oxygen.

The invention consists in certain novel features of construction and combinations of parts which will be hereinafter described and pointed out in the claim.

In the accompanying drawings a longitudinal vertical sectional view of the invention is disclosed.

A represents the frame, preferably constructed of wood or fiber, and provided with slots 1.

Mounted in the slots are bars B, B. These bars are composed of mica or micanite of the built-up type. Interposed between the bars B are strips C. C of mica or micanite. These strips are fitted between the bars and near the ends of the bars.

Copper or brass gauze 2 is received between the bars B, and is fastened in position between the bars B and strips C. Every other sheet or strip of gauze 2 is connected with one pole of a high-voltage (4 to 6 thousand volts) alternating current, and the other strips of gauze with the negative pole, thus inducing surface tension on either side of the mica and a large number of minute electric arcs so produced emitting a constant glow of ultra violet light. Air is then passed through the space between the mica and the sheets or bars of gauze, preferably under pressure, bringing it into intimate contact with the discharge and attendant violet light, thereby producing a molecular change in the atmospheric oxygen from $O_2$ to $O_3$ producing ozone and dissociated oxygen.

The intersections of the gauze serve as rounded points for discharge, and when eighty-inch mesh gauze is used, there are 6400 said points to the square inch of surface, and the discharge being from both sides of the gauze, it produces 12800 arcs to the inch of surface.

By this apparatus I am enabled, by the arc discharge, to produce ozone which can be used commercially for the purpose of oxidizing, cyanidation, and in other metallurgical processes.

Having fully described my invention, what I claim as new and desire to secure by Letters Patent is:

In an apparatus for producing ozone, the combination with a non-conducting frame, of a plurality of mica or micanite bars mounted therein, spacing strips interposed between the bars, sheets of metallic gauze between the bars supported by the spacing strips, said gauze having no other point of support nor contact than with said spacing strips, alternate sheets of said guaze connected to alternate poles of an electric circuit, whereby surface tension is induced on said bars, and a multiplicity of electric arcs is produced for the purpose of causing a continuous flow of ultra violet rays.

In testimony whereof I affix my signature, in the presence of two witnesses.

MELBOURNE ROY TENNANT.

Witnesses:
 ROY FOLKS,
 WILLIAM HERZOG STICKNEY.